Aug. 21, 1934.　　　　H. O. BATES　　　　1,970,727
LEAF INCINERATOR AND DUMP CART
Filed Aug. 5, 1931　　　3 Sheets-Sheet 1
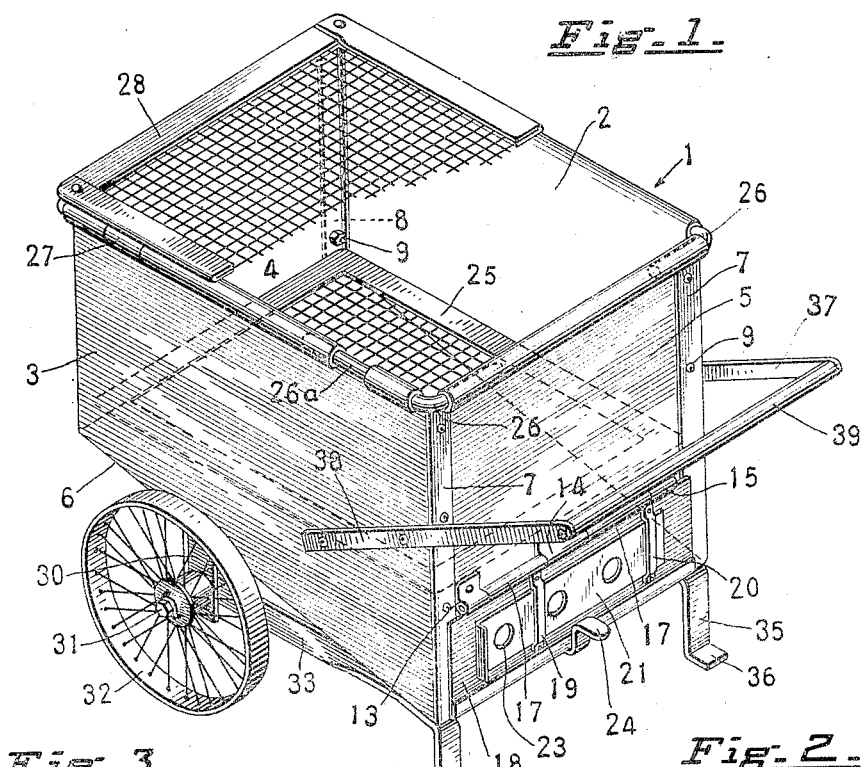
INVENTOR
Harry Ogden Bates,
BY
ATTORNEY

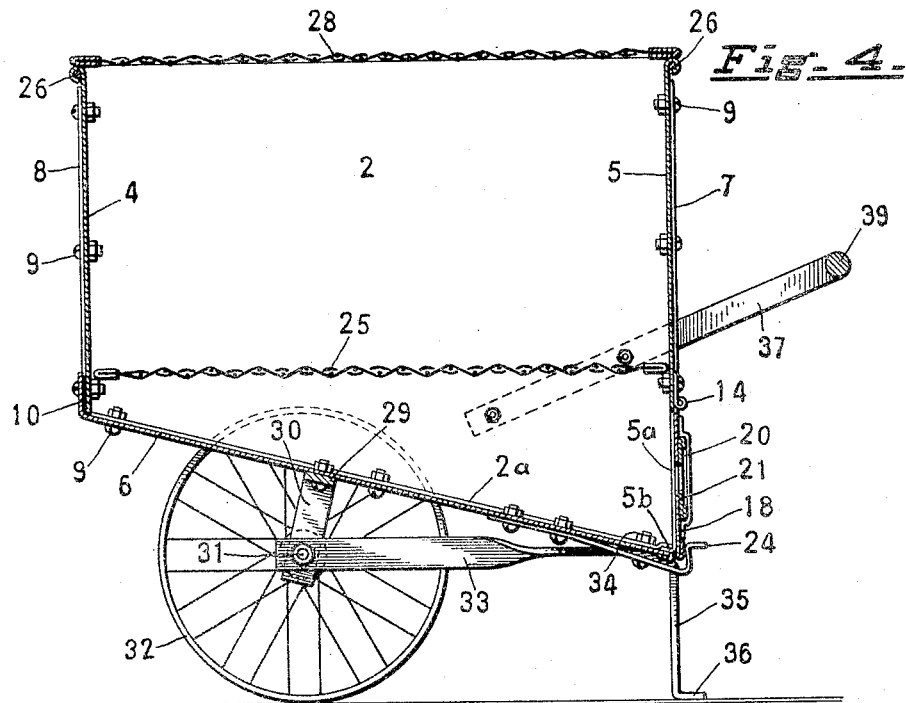
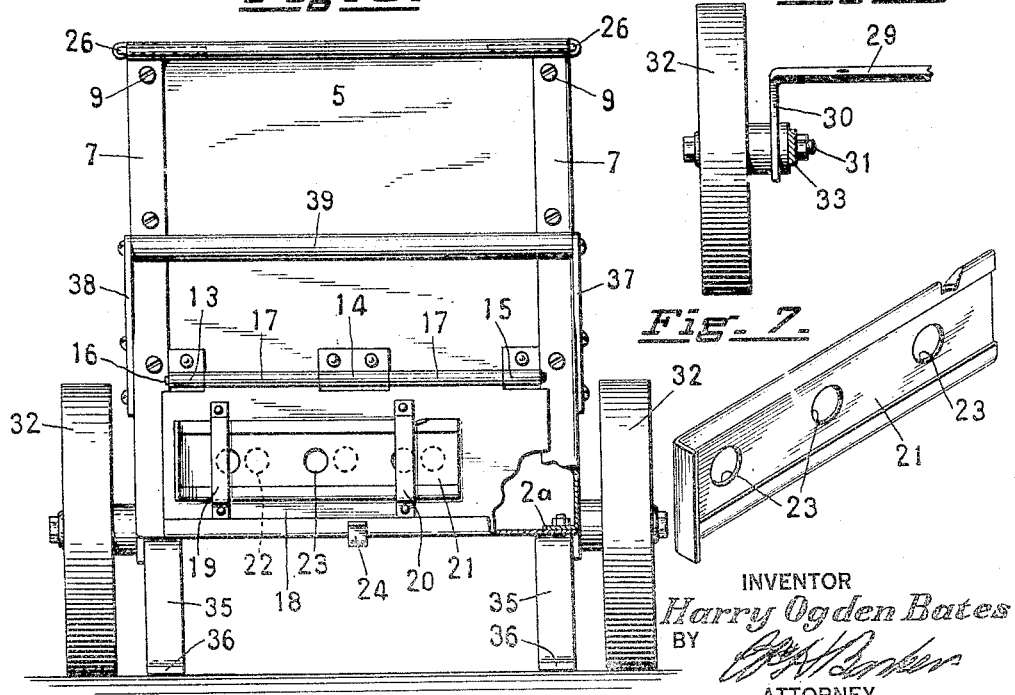

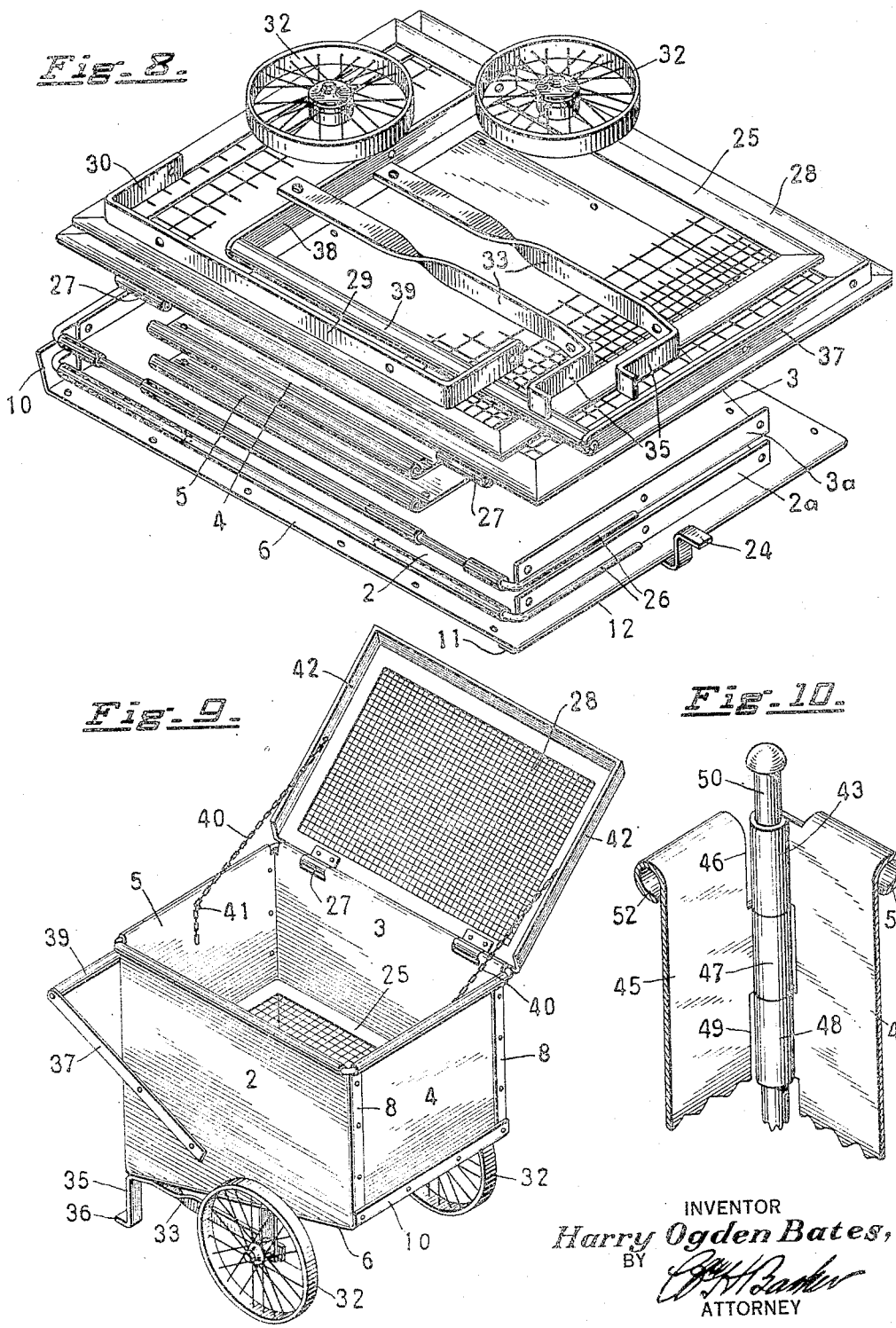

UNITED STATES PATENT OFFICE 1,970,727

LEAF INCINERATOR AND DUMP CART

Harry Ogden Bates, Dalton, Mass.

Application August 5, 1931, Serial No. 555,262

5 Claims. (Cl. 110—19)

This invention relates to a device of a utilitarian character which may be used about the lawns for the collection of debris of one character or another, such as mown grass, leaves, twigs and border cuttings along pathways.

It is intended essentially to perform a number of functions. For instance, it may serve as a dump cart, as an incinerator and a screening device.

Certain of the objects of the invention have been set forth, but the principal object is to provide a device of the character herein described, which may be made up of comparatively light materials with "knock down" features to facilitate packing and shipping.

A further object is to provide a portable device having a screen cover which will serve to remove earthy material from combustible material, the former dropping through on the outside of the cart and the latter falling upon a grate where it may be consumed.

A further object is to provide a device from which ash or other material screened through the grate of the cart, may be redistributed over the ground or grass.

Referring to the drawings:

Figure 1 is a perspective view of the device with the parts broken away.

Figure 2 shows the cart in partial dumping position.

Figure 3 shows the cart in complete dumping position.

Figure 4 is a central vertical section through the cart.

Figure 5 is a rear end view.

Figure 6 is a detail showing a method of mounting the wheels on the axle.

Figure 7 is a fragmentary view of the ash door.

Figure 8 illustrates the device as knocked down for shipping.

Figure 9 is a perspective view illustrating the device as used for screening.

Figure 10 is a modified form of attaching means for the panels at their corners.

It is admittedly not a new thought to provide incinerators of various characters, but these have usually been of a cumbersome character or have not combined elements which serve the full purposes of a utility cart for use about lawns and gardens.

I have endeavored to combine, in one structure, a simple form of various features which I have found necessary to provide for various types of work. For instance, for spring gardening, loads may be carried from place to place and dumped. In this case, the lower grate is usually removed.

If it is desired to spread fertilizers, the grate may be left in place and fertilizers filled in at the top. By manipulating the grate, they may be broken up and allowed to drop out of the openings in the rear door so that they are readily spread over the lawn or garden.

Where materials are handled which contain considerable earthy material, they may be thrown against the open cover or screen, whereupon the earth will be shaken loose falling outside the cart, while the fibrous materials drop down upon the grate.

When used as an incinerator for refuse and leaves, the closing of the top screen gives safety and by regulating the damper at the end of the cart, desired combustion may be secured. When so used, refuse may be continuously added and the fine ash will pass through the grate into the bottom part of the cart. This may be removed, from time to time, by opening the end door or it may be respread by opening the damper openings or the end door while the cart is in motion.

It is believed these various attributes provide a cart having all the necessary features of utility for general gardening and horticultural work.

Referring to the drawings, numeral 1, indicates the body of the cart which is made up of two sides 2, 3, ends 4, 5, and a bottom 6.

The side parts 2, 3, have inturned flanges at their ends, as at 7, 8, and the end pieces and flanges are punched to receive fastening devices 9, which may be in the form of bolts and nuts.

The bottom section of the cart has an upturned flange 10, which is secured to the shorter end part 4. At its opposite end, it is turned under, as at 11, Figure 8, to form a stiffener for the edge 12.

The side members 2, 3, also have inturned flanges 2a, 3a, which are secured to the bottom 6. The end piece 5, has a door opening cut therethrough as at 5a, and at the sides of the opening, end parts are extended downward and inward, as at 5b, to be clamped below the flanges 2a, 3a, of the sides, thus forming a stiffener at the sides of the door, hereinafter referred to.

Hinge brackets 13, 14, 15, are secured to the end 5, and a hinge rod or pintle 16, extends therethrough and through the rolled over upper edge 17, of the door 18.

Brackets 19, 20, permit a perforated gate 21, to slide on the door and there are perforations 22, in the door which may be uncovered by the perforations 23, of the gate.

A snap clasp 24, normally locks the door 18, in closed position. When the door is opened, by releasing the snap lock 24, materials held in the bottom of the cart may be dropped down to the rear thereof, and will normally tend to do so, due to the fact that the bottom of the cart slopes sharply downward.

A grate 25, rests adjacent to the upper end of the sloping bottom and just above the door opening at the opposite end of the cart, so that as materials are incinerated, the ash will drop through the gate and toward the door.

The draft for burning may be controlled by the sliding gate 21, and its perforations may also serve to permit scattering of ash or other material from the rear end of the cart.

To secure the side and end members of the cart in their rigid form, corner bars 26, are inserted in the rolled over portion of the side and end members. At one side, as at 26a, these bars project far enough into the rolled over edge to engage a similarly rolled edge 27, of the top screen 28, thus forming a hinge for the cover.

Extending across the bottom of the cart is a bar 29, which is secured to the bottom member of the cart and has downwardly projecting ends 30, which are perforated to receive and support the axle 31, of the wheels 32. To stiffen this axle support, there is a bar 33, also perforated to secure the end of the axle and then bent to an angle of 90°, and secured to the rear of the cart, as at 34. It is then turned at right angles to form legs 35, and foot pieces 36. This provides a very substantial support for the wheels which, though of light construction, have comparatively wide treads. The detail construction is best illustrated in Figures 4 and 6.

In Figure 1, the cart is shown as in normal position, with the screen cover closed. In Figure 2, the cart is upturned until the upper end of the bottom rests upon the ground. The cover is thereupon opened and the contents may be dumped by upending the cart into the position shown in Figure 3.

Removably secured to the side parts of the body of the cart, are plates 37, 38, to the outer ends of which is suitably secured a push handle 39, by which the cart may be rolled forward and backward or dumped.

In Figure 9, the top screen is illustrated as open, and may be held at any desired angle of opening by any convenient means, such as chains 40, engaged with hooks 41.

To prevent overthrow of material, the cover has flanges 42, extending thereabout and when the cover is closed forming a closed enclosure for the top of the cart. By arranging this at the desired angle, materials may be thrown upon the screen and the fibrous material will drop into the cart and upon the grate near the bottom, while the earthy material may be picked up on the outside of the cart. This is particularly advantageous in gardening and cutting borders.

As a means of securing the side and end parts, a slight modification is shown in Figure 10, in which the rolled sections of any two parts are alternately cut away. Section 43, of the member 44, is rolled at its edge while corresponding section of the part 45, is cut away, as at 46, but is rolled as at 47.

There is a second rolled portion 48, over the edge 44, and a corresponding cut out 49, for the member 45. This continues along the edges.

A pin 50, is then driven down through the superimposed rolled portions 43, 47, 48, and holds them securely together.

The upper edges of the members may be rolled as at 51, 52, as in the form of device heretofore described, and may be secured by right angle pins.

Pins and rolled portions take the place of numerous nuts and bolts and effect some convenience in the knocked down structure of the type defined.

Figure 8, illustrates various parts heretofore described, in knocked down position. It is obvious that a cart of considerable size may be disassembled and all of its parts laid in a compact form for a simple crating operation. This makes a convenient method of transportation.

Inasmuch as all of the parts are stamped out and bent to form, there is absolute uniformity and spare parts may be readily supplied, which will fit any given type of cart.

Obviously, the exact detail and arrangement of the various parts of the device, as shown, are only exemplary, and may be modified to suit the exigencies of any particular requirements. It will be observed, however, that the main features are those of ready assembly and disassembly. The first to provide a very substantial structural form of cart having the advantages attributed to it, and the second having these parts so arranged to form, that they may be readily disassembled and packed away in comparatively small space.

When knocked down, the entire cart may be conveniently shipped and the fastenings are of such a character that any one can readily assemble the parts.

There is a further advantage in this knock down feature, inasmuch as users often have little or no space to keep such a cart, for instance, through the winter. It may, therefore, be knocked down and packed away until the spring, when it is again most desirable for use.

What I claim as my invention and desire to secure by Letters Patent is:

1. In a portable incinerator, sheet metal sides and ends, the side members having angles struck therefrom to engage the ends and the bottom, removable securing means engaging the flanges, the end parts and the bottom, said end and side portions being rolled at their top edges and removable right angle bars fitting in the rolled edges at the meeting corners and a running gear with wheels for supporting the structure.

2. In a portable incinerator of the character described, a body having sides, ends and a bottom removably secured to one another, the bottom sloping downwardly from front to rear, a running gear for wheels for supporting the structure, a foraminous cover at the top and means for holding said cover at any desired angle to the body of the incinerator so that the cover may serve as a screen for screening the materials to be incinerated.

3. In a portable incinerator of the character described, having side and end parts and a bottom sloping from one end to the other of said parts, all removably secured to one another to provide a collapsible device, a running gear with wheels for supporting the structure, a grate located within the structure in a substantially horizontal position as compared with the sloping bottom and a foraminous cover hinged to one side part with means for holding said cover at an inclination to said part, so that the materials to be incinerated may be screened.

4. In a knockdown portable incinerator of the character described, side and end parts rolled at their upper edges, right angle bars projecting into the rolls to secure the corners, means for removably securing the ends, sides and bottom in place, a running gear with wheels for supporting the structure and a foraminous cover hinged upon the right angle bars projecting into the rolls of one of the side parts.

5. In a portable incinerator, sheet metal sides and ends, means for removably securing the end parts and bottom, said end and side portions being rolled at their top edge, a cover having hinge loops at one side, spaces cut away from the roll of the rolled edge of one side part to receive the hinge loops of the top, removable right angle bars fitting in the rolled edges at the meeting corners and extending through the hinge loops and means for supporting the structure.

HARRY OGDEN BATES.